United States Patent [19]

Finegold

[11] 4,446,393

[45] May 1, 1984

[54] DYNAMOELECTRIC FIELD ASSEMBLY AND WINDING THEREFOR

[75] Inventor: Hyman B. Finegold, Dayton, Ohio

[73] Assignee: The Globe Tool & Engineering Company, Dayton, Ohio

[21] Appl. No.: 971,686

[22] Filed: Dec. 21, 1978

Related U.S. Application Data

[62] Division of Ser. No. 736,880, Oct. 29, 1976, Pat. No. 4,131,988.

[51] Int. Cl.³ .............................................. H02K 3/00
[52] U.S. Cl. .................................. 310/184; 310/198; 310/208
[58] Field of Search ..................... 310/42, 45, 71, 180, 310/184, 189, 25.8, 198-208, 269; 29/605; 72/137, 142; 140/92.2

[56] References Cited

U.S. PATENT DOCUMENTS

| 533,323 | 1/1895 | Stanley | 310/184 |
|---|---|---|---|
| 677,308 | 6/1901 | Eickemeyer | 310/211 |
| 1,406,092 | 2/1922 | Schulz | 310/198 UX |
| 1,451,374 | 4/1923 | Rogers | 310/198 UX |
| 3,525,889 | 8/1970 | Robinson | 310/45 |
| 3,624,441 | 11/1971 | Todd | 310/258 |
| 3,629,636 | 12/1971 | Hill | 310/184 |
| 3,824,683 | 7/1974 | Rhudy | 310/45 |

Primary Examiner—R. Skudy
Attorney, Agent, or Firm—Roger S. Dybvig

[57] ABSTRACT

A starter motor field winding assembly comprises a stator ring, plural pole pieces on the ring, and a field winding comprising an uninterruptedly continuous conductor wound to encircle the pole pieces. The conductor comprises strapping edge wound about cores to form coils. The strapping between coils is edge bent to form connections from one coil to the next. The cores about which the coils are formed may be affixed to an arbor or may be removably mounted on the arbor and thereafter assembled to a stator ring to form the pole pieces of the completed stator assembly.

5 Claims, 11 Drawing Figures

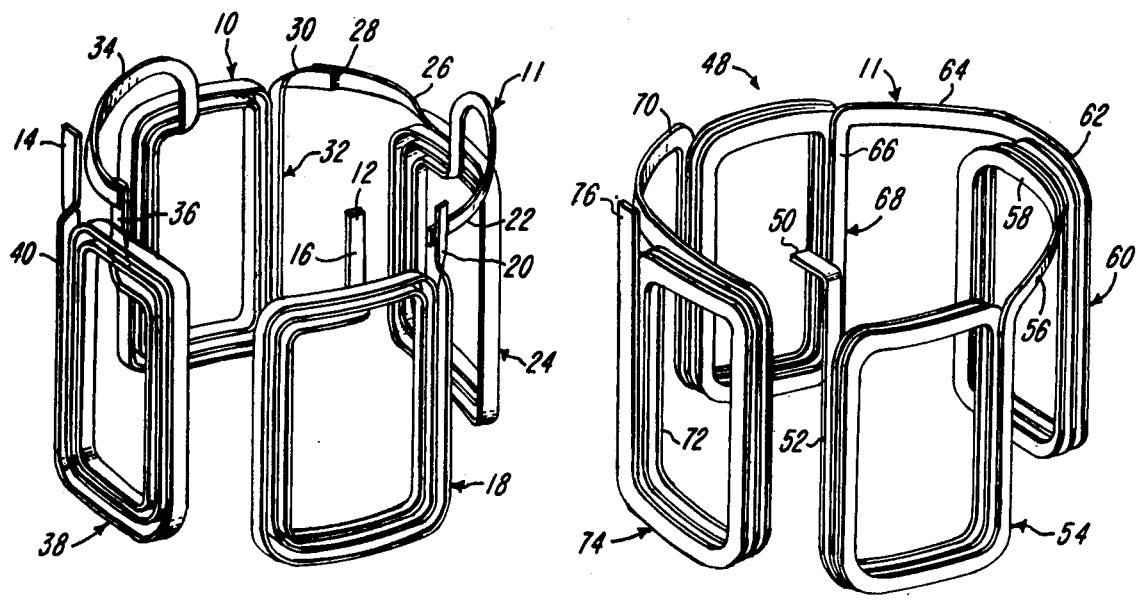
FIG. 1 (PRIOR ART)
FIG. 2
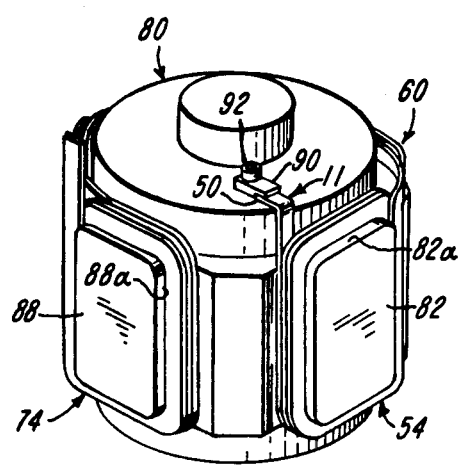
FIG. 3
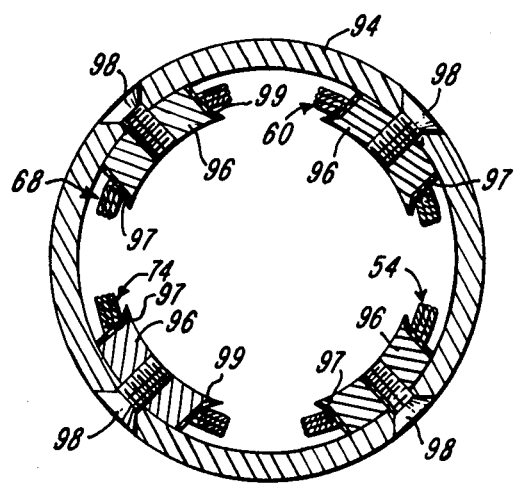
FIG. 4

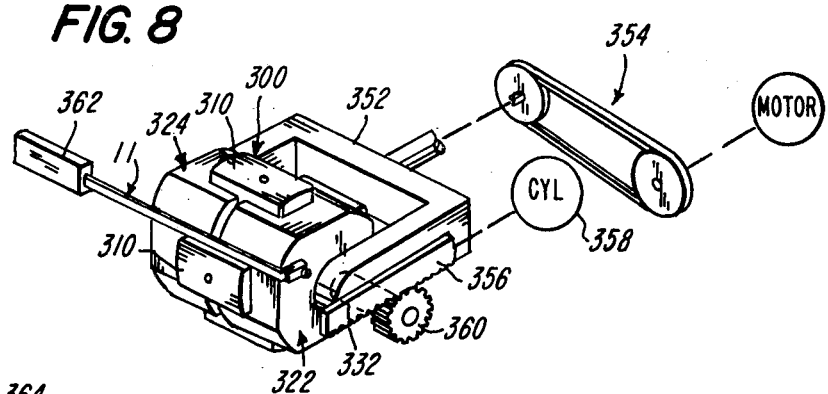
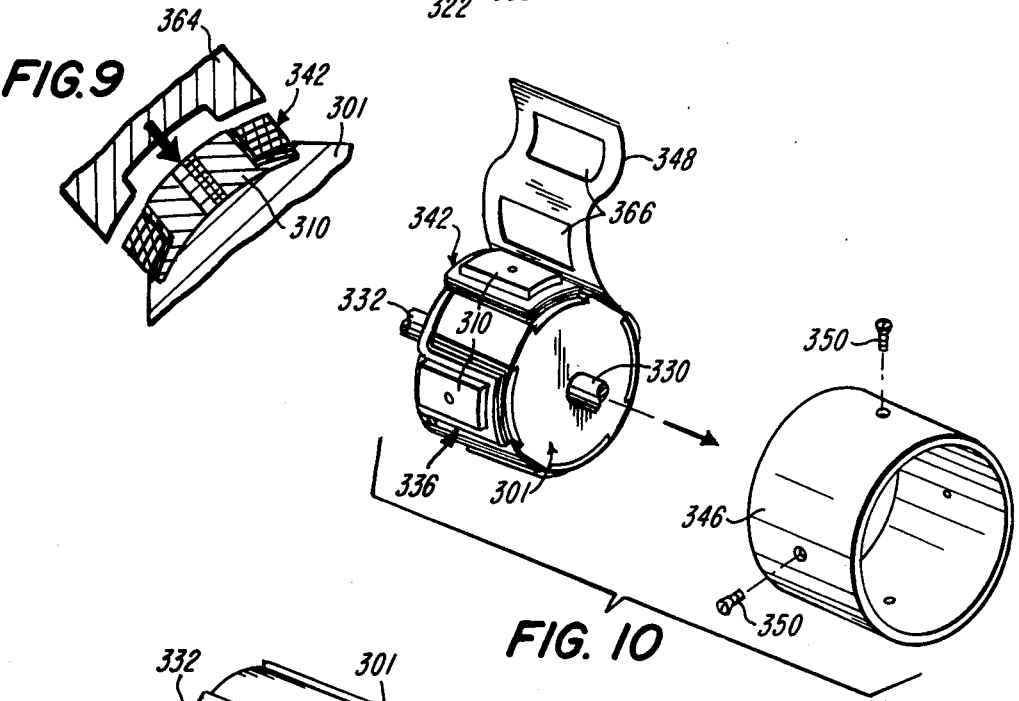
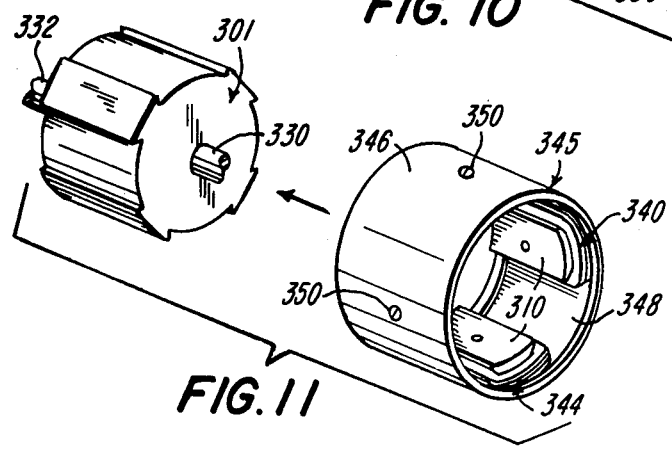

4,446,393

DYNAMOELECTRIC FIELD ASSEMBLY AND WINDING THEREFOR

This is a division of application Ser. No. 736,880, filed Oct. 29, 1976, for DYNAMOELECTRIC FIELD MEMBER, METHOD AND APPARATUS now U.S. Pat. No. 4,131,988, granted Jan. 2, 1979.

BACKGROUND OF THE INVENTION

1. Field of the Invention

The present invention relates to dynamoelectric field members such as may be produced by winding, to a field winding and to methods and apparatus for producing field windings and field assemblies.

2. Prior Art

It is known in the prior art to wind portions such as individual coils of a field member by the edge winding of strapping. While such edge wound coils have been suggested for use in numerous applications, it has not heretofore been the practice to produce complete field members having plural coils by a continuous winding produced from an uninterruptedly continuous length of conductive strapping, portions of which may be edge wound.

SUMMARY OF THE INVENTION

In the present invention, field members of the type used, for example, in the production of automobile starter motors, are wound from start to finish with an uninterruptedly continuous length of conductive wire or strapping which preferably has an insulating coating. In one embodiment disclosed, the winding comprises interconnected coils, and the apparatus for accomplishing the winding includes a mandrel having core pieces, one for each coil, the strapping being edge wound successively about each of the core pieces. The portions of the strapping connecting between adjacent coils are edge bent and each extends from the radially outermost convolution of one coil to the radially innermost convolution of the next adjacent coil. In a modification, the cores upon which the strapping is wound are detachable from the mandrel and transferable with the strapping to provide pole pieces for a dynamoelectric field member. In both embodiments, the mandrel is constructed so that the strapping may be supported in position to be guided upon the core pieces and the mandrel moved rotationally about an axis perpendicular to its major axis for causing coils to be formed thereon and rotationally about its major axis for forming connecting portions between coils.

When using a mandrel having detachable core pieces, removable supports are provided for temporarily holding the core pieces while the winding is being made. After the winding is completed, the supports are removed, the coil shapes are formed as desired, and the mandrel with the removable core pieces is inserted into a stator housing or ring. The core pieces are then connected to the ring by threaded bolts or the like and the mandrel removed from the ring and the winding and pole pieces are thereby assembled to the ring.

BRIEF DESCRIPTION OF THE DRAWINGS

FIG. 1 is a perspective view illustrating a starter motor field winding known in the prior art.

FIG. 2 is a perspective view illustrating a starter motor field winding accomplished in accordance with the present invention and having electrical characteristics comparable to the winding of FIG. 1.

FIG. 3 is a perspective view illustrating a mandrel upon which the winding of FIG. 2 has been formed by edge winding.

FIG. 4 is a section view taken diametrically across the stator for an automotive starter motor utilizing the field member illustrated in FIG. 2.

FIG. 8 is a perspective view illustrating in simplified form apparatus for use with a mandrel for winding the field winding of this invention. In FIG. 8 the mandrel illustrated is the mandrel shown in FIGS. 5 and 6.

FIG. 9 is an illustration of a forming step subsequent to the winding of the coils.

FIG. 10 is a perspective view illustrating steps in the assembly of the coils to the stator housing or ring.

FIG. 11 is a perspective view similar to FIG. 10 and illustrating a further step.

DETAILED DESCRIPTION OF THE PREFERRED EMBODIMENTS

Figure 5:
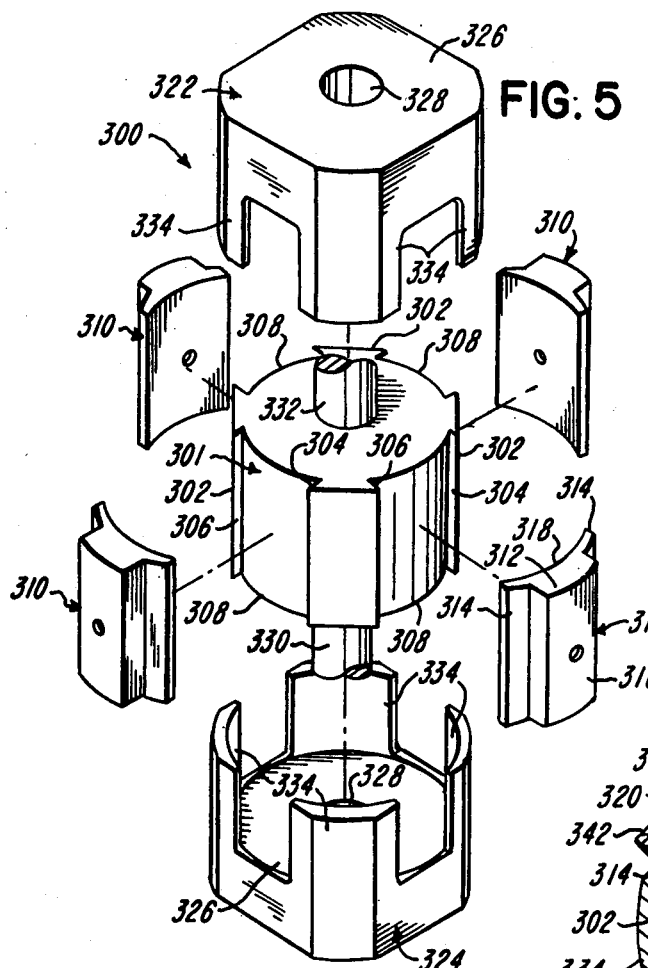
FIG. 5 is an exploded perspective view illustrating a mandrel with detachable core pieces and apparatus used during the winding of a field winding on the detachable core pieces.

Referring to the drawings, reference numeral 10 in FIG. 1 designates a stator winding of the type commonly used in starter motors for automobiles. The conductive wire 11 used to fabricate the winding is commonly referred to as strapping. To simplify this prior art illustration, insulation interleaved with the strapping has been omitted. Such strapping comprises a thin, generally continuous wire strap having a thickness substantially less than the width of its major sides. When such strapping is wound by bending the strapping about an axis parallel to the major sides thereof, the resultant band or winding is described as flat bent or flat wound. When the strapping is wound by bending about an axis perpendicular to the major sides of the strapping, the resultant winding is referred to as edge bent or edge wound. The winding of FIG. 1, having been accomplished generally by bending the strapping about axes parallel to the major sides of the strapping, is therefore in the nature of a flat wound winding.

The winding 10 has a first terminal 12 and a second terminal 14 which are adapted for connection to a battery or other source (not shown) when mounted into the housing or yoke of an electric motor. The first terminal 12 is at the end of a start end or leg 16 of a first coil 18. Coil 18 is flat wound and convoluted outwardly from the innermost convolution thereof to the outermost convolution thereof. At the commencement of the winding of the coil 18, its start end 16 is first flat bent and then edge bent. At the end of the winding the finish end or leg is rotated or twisted approximately 90° about its central axis to form an upwardly extending twisted termination 20 to which is soldered a start end or leg 22 of a second coil 24. The leg 22 is edge bent downwardly and by combined edge and flat bends rotated approximately 90° about its own axis to commence the second coil 24, which is flat wound outwardly from the innermost to the outermost convolution. Its outermost convolution is twisted to form a termination 26 that is brazed or soldered at 28 to a termination 30 of a third coil 32. Commencing with a start end or leg 34 which is bent downwardly and then both edge and flat bent to accomplish a 90° rotation about its own axis, the third coil 32 is flat wound outwardly from the innermost to the outermost convolution. The outermost convolution is both bent and twisted to form the termination 30. The start leg of the third coil 32 is soldered or brazed to the start end or leg 36 of a fourth coil 38. The coil 38 is also flat wound and convoluted outwardly from the innermost convolution thereof to the outermost convolution thereof. At the commencement of the winding of the fourth coil 38, its start end 36 is first flat bent and then edge bent and at the end of the winding the final convolution includes an upwardly extending leg 40 which is twisted approximately 90° about its center axis to form the termination 14.

As previously indicated, the winding 10 is representative of prior art. The winding is accomplished by individually winding the coils 18, 24, 32 and 38 using four separate winding machines and then soldering or brazing the terminal ends of the coils in the manner illustrated in FIG. 1. Considering current flow through the coils and assuming a positive potential applied to the first terminal 12 and ground applied to the second terminal 14, a positive current will flow counterclockwise about the first coil 18, clockwise about the second coil 24, counterclockwise about the third coil 32, and clockwise about the fourth coil 38 if the observer is located outside the periphery of the winding. It is noteworthy that the sections of strapping which are used for the winding form four separate coils wherein each coil required at least one and sometimes two 90° twists of the strapping about its own axis for completion of the coil, edge bending as well as flat bending of the strapping, and brazed or soldered connections were required to interconnect the coils.

FIG. 2 illustrates a winding 48 which is comparable in terms of electrical characteristics to the prior winding of FIG. 1 but which, in accordance with the present invention, has been accomplished with an uninterruptedly continuous length of insulated strapping 11. The winding is accomplished without soldering or brazing and twisting or rotation of the strapping about its own axis as is required on numerous occasions to accomplish the prior art winding. A particularly notable feature is that the winding of FIG. 2 is an edge wound winding as opposed to the flat wound winding of FIG. 1.

Progressing through the generally circular winding of FIG. 2, the winding commences with a start end or terminal 50. From the terminal 50 the strapping proceeds horizontally to a flat bend, from which the strapping proceeds downwardly along a straight section of a convolution 52, which is edge wound to form a coil 54. It can be noted that the successive convolutions of the coil 54 proceed axially outwardly as they are wound one adjacent the other. Thus the coil 54 increases in axial thickness as successive convolutions are added to the coil. Comparing this feature to the flat wound coils of FIG. 1, it should be noted that the coils of FIG. 1 each have a substantially constant axial thickness with respect to an axis surrounded by the coil, but each of the coils of the winding 10 has an increasing radial thickness as the number of convolutions in each such coil increases.

After winding of the coil 54, the finishing portion of the wire is edge turned to form a starting portion or leg 56 which continues uninterruptedly into the first convolution 58 of an edge wound coil 60 which is wound axially outwardly by edge winding until a final convolution or finishing portion 62 is wound.

After completion of the convolution 62, the strapping is continued without interruption along a starting portion by a leg 64 which continues without interruption to the commencement of the first convolution 66 of an edge wound coil 68. It will be noted that the leg 64 is bent downwardly so that it does not span over the third coil 68, whereas the aforementioned leg 56 spans from the first coil 54 over the second coil 60. The coil 68 again increases outwardly in axial thickness as successive convolutions thereof are wound.

After winding of the coil 68, its finishing portion continues without interruption along an arm 70 and without interruption to form the innermost starting portion or convolution 72 of an edge wound coil 74 where, again, the coil progresses axially outwardly in thickness to the final convolution thereof which is edge turned to form a finish portion or terminal 76. The resultant winding 48 is characterized by a generally cylindrical shape in which the coils 54, 60, 68 and 74 are laterally spaced apart and the start and finish portions which interconnect the coils are disposed at the upper axial extreme of the winding as appears in FIG. 2.

In addition to the use of edge winding as opposed to the flat winding in FIG. 1 and the use of a continuous strapping in the winding of FIG. 2, another notable feature of the winding of FIG. 2 is that all coils are wound outwardly from an axially innermost convolution to an axially outermost convolution. Further, the winding of FIG. 2 is generally circular when viewed from either end thereof and the major surfaces of the strapping are parallel to the longitudinal axis of the winding throughout all of the coils and the connections therebetween. Accordingly, the entire length of strapping used to form the winding 48 has its major surfaces lying essentially along the periphery of the imaginary cylinder which the coils form. After completion of the winding 48, the flat bent part of the start portion or terminal 50 could be either straightened or cut off. As an alternative, the winding may be accomplished without the flat bend in the start portion 50. In either event, the winding 48 can be inserted directly into a stator housing or ring and suitable terminal connections made for electrical connection to the terminals 50 and 76. No solder or brazed connections are required in the winding 48, and all connected coils are interconnected by edge bent strapping portions having major faces lying substantially in the same imaginary cylinder as the major faces of the coils.

Considering the electrical characteristics of the winding 48, one can consider that the starting terminal 50 is connected to a source of positive voltage, and that the finishing terminal 76 is connected to ground. With such connections, a positive current as "seen" by an observer outside the winding will flow counterclockwise in the coil 54, clockwise in the coil 60, counterclockwise in the coil 68 and clockwise in the coil 74 to ground at the terminal 76. The electrical result will be basically the same as for the prior art coil illustrated in FIG. 1.

FIG. 3 illustrates the general manner in which a winding such as described in reference to FIG. 2 can be accomplished on a mandrel, generally designated 80. The mandrel 80 comprises a generally cylindrical body or arbor having four outwardly projecting and generally rectangular cores 82, 84, 86 and 88 bounded by respective side walls or shoulders 82a, 84a, 86a and 88a. Only the cores 82 and 88 and their side walls 82a and 88a appear in the drawings.

A piece of strapping 11 is secured at one end thereof, forming the start end 50 of the winding 48, to one end of the mandrel 80 by means of a clamp 90 secured by a fastener 92. The strapping is so secured to the mandrel 80 that, with a single 90 degree bend, the strapping can be flat bent to commence the innermost convolution 52 of the coil 54 which is wound edgewise about the shoulder 82a to produce counterclockwise wound coil 54. It may be noted that other means, not shown, could be provided to grip the start and 50 such that the flat bend would be unnecessary.

The strapping which forms the outermost convolution of the coil 54 is then turned edgewise, extended circumferentially adjacent the upper shoulder, not appearing in FIG. 3, of the mandrel core 84, also not appearing in FIG. 3, edge bent downwardly and then wound edgewise in the clockwise direction about shoulder 84a to produce the coil 60 appearing in FIG. 2. Because of the edgewise turning of the strapping after the winding of the coil 54, it will be noted that the edge of the strapping engaging the shoulder 82a is the opposite edge of the strapping which engages the shoulder of the core piece 84. A study of FIGS. 2 and 3 will reveal that the coils wound in a clockwise direction have the same strapping edges confronting and engaging the core pieces and those wound in a counterclockwise direction have opposite edges confronting and engaging the core pieces.

The strapping is then continued from the coil 60 peripherally about the mandrel 80, edge bent downwardly adjacent the left hand side of the core 86, not appearing in FIG. 3, and then edge wound about such core to accomplish the counterclockwise winding of the coil 68 which appears in FIG. 2.

The strapping is then continued from the coil 68 and along the upper part of the shoulder 88a, as appears in FIG. 3, and edge wound clockwise about the core 88 to accomplish the coil 74. The last convolution of the coil 74 is permitted to extend vertically upwardly as appears in FIG. 3 to form the terminal 76 which also appears in FIG. 2.

FIG. 4 schematically illustrates a starter motor field assembly using the winding of FIG. 3. After release of the clamp 90 illustrated in FIG. 3, the winding is pulled outwardly and away from the mandrel 80, returned and formed as needed to a generally circular shape, and inserted into a hollow, cylindrical stator housing or ring 94. Four individual pole pieces identified by the reference numeral 96, and each preferably surrounded by insulating sleeves 97, are then fastened in a circular array to the stator ring at 90 degree circumferential angles by means of suitable fasteners 98 threaded into the pole pieces 96 so that the pole pieces 96 project inwardly of the ring 94. In such assembly, both the axially and circumferentially extending side walls of the pole pieces 96 are confronted by the radially innermost edge surfaces of the strapping but insulated from the strapping by the sleeves 97. Only the axially extending side walls, designated 99, are illustrated in the section of FIG. 4. As is conventional, these are outwardly flanged or flared to retain the coils thereon. In the illustration of FIG. 4, there is a substantial spacing between the curved inside surface of the ring 94 and the radially outermost surfaces of the coils 54, 60, 68 and 74. In practice, the radial dimensions of the coils 54, 60, 68 and 74 relative to the radial length of the pole pieces 96 is preferably such that the flared side walls 99 compress the several coils 54, 60, 68 and 74 against the inside surface of the stator ring so that the coils are snugly retained on the ring. Suitable terminal connections, not shown because well known to those skilled in the art, are then provided for connection of the start and finish portions 50 and 76 appearing in FIG. 2 to an electrical source.

The field assembly is thus seen to include a one-piece winding comprising a single length of conductive strapping edge wound into the laterally spaced and connected coils 54, 60, 68 and 74, one coil surrounding each of the pole pieces 96. Since the strapping forming the coils is coated with insulating material, there is electrically insulating means between adjacent convolutions of each coil. As possible alternatives, insulation could be formed between the coil convolutions after the winding is completed, or insulating strips could be wound with the strapping. When assembled in the ring 94, the adjacently located coils are connected by edge bent portions of strapping integral with the coils and extending from a finishing, radially outermost portion of one coil to a starting, radially innermost portion of the adjacently located coil. As is obvious from an inspection of the drawings, the major sides of the coils and also the connecting strapping portions between them are substantially concentric with the inside surface of the ring 94. The same would be true of the connection between coils 54 and 74 if either one or both of their adjacent termination legs 50 and 76 are edge bent to produce the connection.

Figure 6:
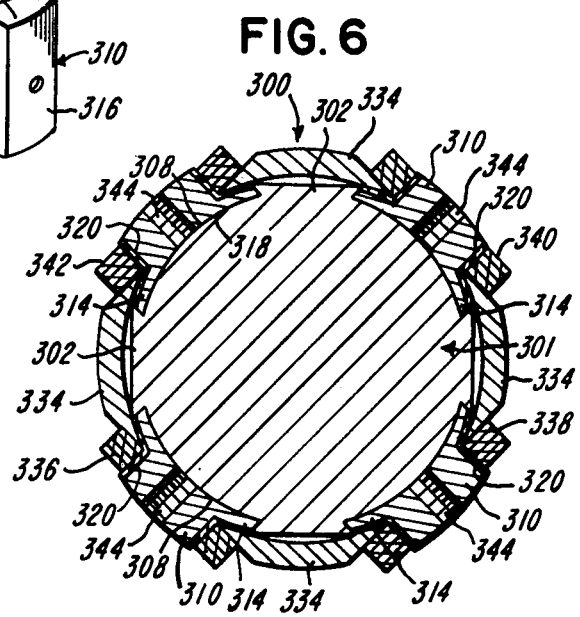
FIG. 6 is a section view taken diametrically across the mandrel and associated parts of FIG. 5 after the field winding has been wound.
Figure 7:
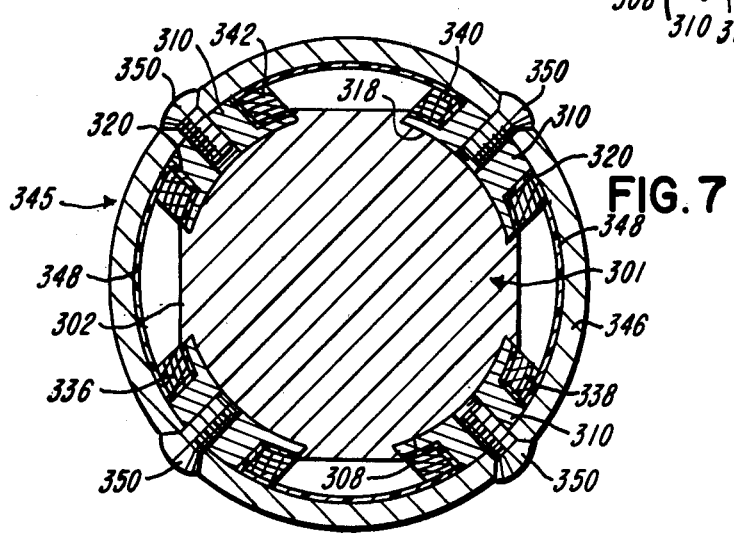
FIG. 7 is a section view taken diametrically across a stator for an automotive starter motor and a mandrel of the type shown in FIGS. 5 and 6 and illustrates one step in the assembly of the field winding wherein the core pieces are used as the field pole pieces.

FIGS. 5, 6 and 7 illustrate a modification wherein a mandrel, generally designated 300, comprises an assembly of parts including core or pole pieces about which coils are edge wound. Upon completion of the winding, the core or pole pieces are separated from the assembly along with the winding for insertion into a stator yoke wherein the core pieces are fastened to the stator yoke so as to function as stator pole pieces.

The mandrel 300 can be seen to comprise a generally cylindrical body or arbor 301 having radially outwardly extending keys 302 along the length thereof. The radially extending surfaces of the keys 302 are identified by the reference characters 304 and 306, respectively. The keys 302 are flanked by recessed, axially extending, arcuate surfaces 308, there being four such arcuate surfaces 308, each bounded by a pair of radial surfaces 304 and 306. The keys 302 are designed to slidably receive between them core pieces 310, there being one core or pole piece 310 for each arcuate surface 308. Thus for a winding having four coils, there are four core pieces 310 as illustrated.

Each core or pole piece 310 comprises a generally rectangular body member 312 having arcuate flanges 314 projecting from each axially extending side wall and having a convexly curved outer surface 316 and a concavely curved inner surface 318. The core pieces 310 are shaped to become the pole pieces for the field assembly as will be described below and may be shaped identically to pole pieces presently in use.

As best shown in FIG. 6, the keys 302 and the arcuate surfaces 308 are so constructed that the flanged portion of the core pieces 310 can be slidable in either axial or radial directions relative to the axis of the arbor 301 to be snugly received thereby. The core pieces 310 can then be assembled in abutting relation with the arcuate surfaces 308, whereupon the core pieces 310 provide the same function as the core pieces 82, 84, 86 and 88 illustrated in FIG. 3. Since the pieces 310 will become the pole pieces of the completed field assembly, an insulating sleeve 320 is placed on each of the pieces 310 prior to the winding of coils thereon.

The pieces 310 are clamped to the arbor 301 by means of a pair of sliding clamp members 322 and 324 which may be of identical construction. Each has an end plate designated 326 apertured at 328 to receive a shaft part 330 or 332 projecting from the opposite ends of the mandrel 300 and four clamping fingers 334 projecting from the corners of the end plate 326. The clamp members 322 and 324 are adapted to be extended over opposite ends of the arbor 301 with each of the clamp fingers 334 centered over one of the keys 302 and with the axially extending side edges of the clamp fingers 334 overlying the flange portions 314 of the core pieces 310 and the parts of the insulating sleeve 320 lying against the flanged portions 314. As clearly illustrated in FIG. 6, each clamping finger 334 spans across adjacent flanges 314 of adjacent core pieces 310 when the parts are assembled. The arbor 301 is substantially the same length as the pieces 310 and the clamp fingers are slightly less than one-half said length. Accordingly, the end plates 326 of the clamp members 322 and 324, upon assembly of the mandrel 300, centrally locate the pieces 310 on the arbor 301. When assembled to the arbor 301, the fingers 334 of the clamp member 322 are aligned with and confront the corresponding fingers of the clamp member 324. This assembly is shown in FIG. 8. The inside surfaces of the side edges of the clamp fingers 334 can engage the core or pole piece flange portions 314 with a sufficiently close friction fit that the assembled mandrel 300 will remain assembled unless forcibly disassembled. Alternatively, or in addition, separate means (not shown) could be provided for holding the clamp members 322 and 324 in assembled relation to the arbor 301.

The assembled mandrel comprising the arbor 301, the core pieces 310, and the clamp members 322 and 324 has essentially the same configuration as the mandrel 80 illustrated in FIG. 3. Therefore, strapping can be edge bent or wound around the side walls or shoulders of the core pieces 310 to form coils and edge bent to duplicate the connecting portions 56, 64 and 70 shown in FIG. 2. FIG. 6 shows the mandrel 300 with completed coils designated 336, 338, 340 and 342 wound thereon.

With reference to FIGS. 6 and 7, the core or pole pieces 310 have centrally located threaded apertures 344 extending therethrough so that they may be used as the pole pieces of a completed starter motor field assembly 345 shown in FIG. 7. The field assembly 345 includes a stator housing or ring 346 which has an insulating liner 348 and which also has apertures for receiving screws 350 for attachment of the pole pieces thereto.

FIGS. 8-10 illustrate in simplified form the steps followed in the manufacture of the starter motor field assembly 345. The winding of the coils on the mandrel 300 can be accomplished as illustrated in FIG. 8 wherein the shaft parts 330 and 332 of the arbor 301 are journalled for rotation in opposed parts of a yoke 352 rotatably driven by a yoke drive assembly 354 about an axis extending centrally through the mandrel 300 perpendicular to its longitudinal axis. The mandrel 300 may be rotated about its longitudinal axis by a rack 356 mounted on the yoke 352 and driven by a drive cylinder 358 or the like and which engages a pinion 360 mounted on the shaft part 332. One end of the strapping 11 can be clamped to the clamp member 322 and guided from a suitable strapping source (not shown) by a strap guide member 362. As conventional in other winding procedures, the strapping is placed under tension at its source. Therefore, the coils may be edge bent or wound about the core piece 310 by rotation of the yoke 352 and the connecting strapping parts between coils formed by rotation of the mandrel 300 upon energization of the cylinder 358 whereupon the rack 356 rotatably drives the pinion 360. The yoke 352 is rotated in either clockwise or counterclockwise directions to edge wind the coils in the desired directions about the pieces 310. Suitable tooling may be provided to assist in edge bending the strapping as necessary to wind the coils and form the connections between coils.

It will be noted in FIG. 6 that the coils are edge wound around the pole pieces with their radially innermost major surfaces lying flat against and supported by flat surface portions of the clamp fingers 334. Accordingly, the major surface of each convolution thereof is substantially perpendicular to radial lines extending centrally through the apertures 344. After the winding of the coils in the manner described above in connection with FIG. 8, the strapping is severed from its source and the mandrel 300 is removed from the yoke 352 and the clamp members 322 and 324 then removed from the arbor 301. The strapping 11 forming the winding is typically quite stiff so that the completed winding itself will retain the core or pole pieces 310 on the arbor 301. After removal of the clamp members 322 and 324, the arbor 301 carrying the pole pieces 310 with the winding thereon is moved to a coil forming machine which modifies the shape of each of the coils so that they have an arcuate outer periphery concentric with the arbor 301 and are suitably shaped for insertion into the stator ring 346. Forming machines are conventional in the industry and may include, as shown in FIG. 9, one or more forming dies or press members 364. As apparent from an inspection of FIG. 9, advancement of the member 364 toward the longitudinal axis of the arbor 301 will cause the coil 342 to be bent or formed into a circular arc for insertion into the stator ring 346. All coils wound on the pieces 310 are either simultaneously or sequentially formed to the desired arc. The arcuate or circular configuration of all of the coils is clearly shown in FIG. 7.

After forming of the coils, the insulating liner 348 is preferably wrapped around the core or pole pieces 310. As illustrated in FIG. 10, the liner 348 may conveniently comprise an insulating paper or the like sheet having plural apertures 366 which are provided to permit contact between the core or pole pieces 310 and the inside surface of the stator ring 346. The liner 348 is wrapped around the assembled arbor and pole pieces. After wrapping, its ends can be connected as by a piece of tape (not shown). This assembly is then inserted into the stator ring 346 and the screws 350 are then inserted through the apertures in the stator ring and threadedly engaged with the pole pieces 310 to affix them along with the winding and the insulating liner 348 to the ring 346. At such time the parts have the appearance illustrated in FIG. 7. Thereafter, the arbor 301 is removed from the assembled field assembly 345 as shown in FIG. 11, ready for reuse in the manufacture of another field assembly. As believed apparent, the winding and assembly method illustrated in FIGS. 8-11 can be accomplished manually with the use of simple tools, or the entire assembly process could be carried out by automatically operating machines with the potential for substantial savings in the cost of manufacture of the conventional starter motor field assemblies utilizing the separately wound coils illustrated in FIG. 1.

Referring to FIGS. 3 and 8, the winding apparatus shown in FIG. 8 could be used for the winding of coils on the mandrel 80 which would be used instead of the mandrel 300. In such event, the coils would be wound and the connections between coils formed by repeated rotations of the mandrel 80 about the axis of rotation of the yoke 352, i.e., perpendicular to the longitudinal axis of the mandrel 80, and about the longitudinal axis of the mandrel 80 in the same manner in which the coils are formed on the mandrel 300. After the coils are wound on the mandrel 80, the coil terminal portion 50 is released from the clamp 90 whereupon the winding can be removed by hand. The coils can then be formed to the desired arcuate configuration and inserted into the stator ring 94. Prior to such insertion of the coils, they would either be wrapped by an insulating sleeve (not shown) which may be identical to the insulator 348 or such insulating sleeve may be positioned within the ring 94. Thereafter the pole pieces 96 with the insulating sleeves 97 thereon would be inserted inside the winding located in the ring 94 and moved radially outwardly through the coils and then attached to the stator ring by the screws or bolts 98 to form the completed field illustrated in FIG. 4.

While the present application describes the manner in which a prior art winding might be substantially duplicated, it will occur to those skilled in the art that numerous variations are possible.

The particular winding described as illustrative of the present invention has the first wound and third wound coils wound counterclockwise, for example, and the second wound and fourth wound coils wound clockwise. The winding techniques described in the present application, of course, include techniques for shifting the direction of wind as from clockwise to counterclockwise or vice versa, i.e., winding one side of the strapping against a core when winding clockwise and the opposite side of the strapping against a core when winding counterclockwise; and the particular sequence of respectively clockwise and counterclockwise windings is thus variable to suit the desires of the customer. Of course, windings having other than four coils could be made in accordance with the principles of this invention. Four coils are illustrated since this is the common configuration for automotive starter motor field windings. This invention is presently believed most suitable for such windings because of the need for the coils thereof to be formed from strapping.

In addition to a substantial savings in the number of operations required to produce a completed field winding, it is expected that this invention can be practiced to produce a savings in the length of strapping used to form a completed winding. Since strapping is normally made from copper which is relatively expensive, and since field windings are normally mass-produced in very large quantities, a savings of even a small length of strapping for each winding can result in a savings of many thousands of dollars a year. It is also contemplated that new coil configurations may be made possible by the practice of this invention and in particular that it may be possible to obtain field strength characteristics comparable to the characteristics obtained in the prior art using windings which occupy a smaller space and, thus, this invention could lead to a reduction in the size and weight of automotive starter motors.

Although the presently preferred embodiments of this invention have been described, it will be understood that within the purview of this invention various changes may be made within the scope of the appended claims.

Having thus described my invention, I claim:

1. A one-piece field winding for a dynamoelectric machine comprising a length of strapping edge wound into at least three laterally spaced coils, each coil having plural convolutions, and each coil connected to at least one other coil by an integral portion of said strapping, the portions of said strapping interconnecting said coils supporting said coils in a circular array of circumferentially spaced coils, and the portions of said strapping extending integrally between coils connected thereby each extend from a radially outermost convolution of one of the connected coils to a radially innermost convolution of the other of the connected coils.

2. The field winding of claim 1 wherein said strapping comprises a thin wire strap having major sides and having a thickness substantially less than the width of its major sides, and wherein said strapping is edge wound about its edges extending between said major sides.

3. A dynamoelectric field assembly comprising a stator ring supporting at least three laterally spaced pole pieces, a one-piece winding comprising a length of conductive strapping edge wound into a plurality of laterally spaced and connected coils, one coil surrounding each of said pole pieces, each coil having plural convolutions, and electrically insulating means between adjacent convolutions of each coil, said ring supporting said pole pieces in a circular array, said pole pieces projecting inwardly from said ring toward the center of said array, said coils being connected by portions of strapping integral with the connected coils, and said connecting portions extending between the radially innermost portion of one coil to the radially outermost portion of a laterally spaced adjacent coil.

4. A dynamoelectric field assembly comprising a stator ring supporting at least three laterally spaced pole pieces, a one-piece winding comprising a length of conductive strapping edge wound into a plurality of laterally spaced and connected coils, one coil surrounding each of said pole pieces, each coil having plural convolutions, and electrically insulating means between adjacent convolutions of each coil, said ring supporting said pole pieces in a circular array, said pole pieces projecting inwardly from said ring toward the center of said array, said coils being connected by portions of strapping integral with the connected coils, said connecting portions extending between the radially innermost portion of one coil to the radially outermost portion of a laterally spaced adjacent coil, said coils extending axially of said array between first and second extremes and all of said connecting portions between said coils being disposed adjacent one of said extremes.

5. A field assembly of claims 3, or 4 wherein said strapping comprises a thin wire strap having major sides and having a thickness substantially less than the width of its major sides, and wherein said strapping is edge wound about its edges extending between said major sides.

* * * * *